(12) United States Patent
Chen et al.

(10) Patent No.: US 11,467,674 B2
(45) Date of Patent: *Oct. 11, 2022

(54) PERFORMING AN ACTION ASSOCIATED WITH A MOTION BASED INPUT

(71) Applicant: BlackBerry Limited, Waterloo (CA)

(72) Inventors: Zhe Chen, Breslau (CA); Nazih Almalki, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/088,741

(22) Filed: Nov. 4, 2020

(65) Prior Publication Data

US 2021/0072835 A1 Mar. 11, 2021

Related U.S. Application Data

(63) Continuation of application No. 16/510,138, filed on Jul. 12, 2019, now Pat. No. 10,884,509, which is a continuation of application No. 16/132,598, filed on Sep. 17, 2018, now Pat. No. 10,353,484, which is a continuation of application No. 13/903,206, filed on May 28, 2013, now Pat. No. 10,078,372.

(51) Int. Cl.
*G06F 3/01* (2006.01)
*G06F 3/0346* (2013.01)
*H04M 1/72454* (2021.01)
*G06F 3/16* (2006.01)

(52) U.S. Cl.
CPC ............ *G06F 3/017* (2013.01); *G06F 3/0346* (2013.01); *H04M 1/72454* (2021.01); *G06F 3/167* (2013.01); *G06F 2201/81* (2013.01)

(58) Field of Classification Search
None
See application file for complete search history.

(56) References Cited

U.S. PATENT DOCUMENTS

| 7,365,737 | B2 * | 4/2008 | Marvit ............... G06F 3/017 345/158 |
| 8,321,219 | B2 | 11/2012 | Mozer |
| 8,341,558 | B2 | 12/2012 | Li |
| 8,351,773 | B2 | 1/2013 | Nasri et al. |
| 8,358,977 | B2 | 1/2013 | Duarte et al. |

(Continued)

OTHER PUBLICATIONS

Office Action; U.S. Appl. No. 16/510,138 dated Aug. 1, 2019.
(Continued)

*Primary Examiner* — Parul H Gupta
(74) *Attorney, Agent, or Firm* — Ridout & Maybee LLP

(57) ABSTRACT

A method for performing an action associated with a motion based input. the method comprises: measuring, using a motion sensor of a computing device, motion data representing a detected motion of the computing device; measuring, using a proximity sensor of the computing device, proximity data representing a proximity of the computing device to an object over a duration of the detected motion; matching the measured motion data and measured proximity data to a gesture based on the detected motion and the proximity of the computing device to the object over the duration of the detected motion; and in response to matching the measured motion data and measured proximity data to the gesture, performing an action associated with the gesture.

18 Claims, 6 Drawing Sheets

(56) References Cited

U.S. PATENT DOCUMENTS

| | | | |
|---|---|---|---|
| 2007/0262951 A1 | 11/2007 | Hule et al. | |
| 2008/0055263 A1 | 3/2008 | Lemay | |
| 2008/0303681 A1 | 12/2008 | Herz | |
| 2010/0001994 A1 | 1/2010 | Kim | |
| 2010/0125816 A1 | 5/2010 | Bezos | |
| 2010/0188328 A1 | 7/2010 | Dodge et al. | |
| 2010/0251177 A1 | 9/2010 | Geppert et al. | |
| 2010/0261505 A1 | 10/2010 | Yeh et al. | |
| 2011/0306304 A1 | 12/2011 | Forutanpour | |
| 2012/0139907 A1 | 6/2012 | Lee | |
| 2012/0225719 A1 | 9/2012 | Nowozin et al. | |
| 2012/0262981 A1 | 10/2012 | Hirsch et al. | |
| 2012/0306745 A1 | 12/2012 | Moore et al. | |
| 2012/0306770 A1* | 12/2012 | Moore | A61P 1/00 345/173 |
| 2012/0313847 A1 | 12/2012 | Boda et al. | |
| 2013/0033418 A1 | 2/2013 | Bevilacua | |
| 2013/0035941 A1 | 2/2013 | Kim et al. | |
| 2013/0053007 A1 | 2/2013 | Cosmann et al. | |
| 2013/0104090 A1 | 4/2013 | Yu et al. | |
| 2013/0106686 A1* | 5/2013 | Bennett | G06F 3/017 345/156 |
| 2014/0204017 A1 | 7/2014 | Wu | |

OTHER PUBLICATIONS

Communication Purusant to Article 94(3); EP 13169560.3 dated Jan. 19, 2016.
Extended European Search Report; EP 13 169 560.3 dated Apr. 1, 2014.
Phone Scoop, Review: Apple iphone 4S for AT&T; Apr. 5, 2013.
Android Central, "How to use Motion gestures on the Galaxy S3" Apr. 5, 2013.
Acti Vocal, Vocally 3 in-line, Voice activated telephone dialer user manual 2013.
Office Action; U.S. Appl. No. 13/903,206 dated Oct. 6, 2014.
Final Office Action; U.S. Appl. No. 13/903,206 dated Mar. 26, 2015.
Advisory Action; U.S. Appl. No. 13/903,206 dated Jun. 19, 2015.
Office Action; U.S. Appl. No. 13/903,206 dated Aug. 14, 2015.
Final Office Action; U.S. Appl. No. 13/903,206 dated Feb. 4, 2016.
Advisory Action; U.S. Appl. No. 13/903,206 dated May 24, 2016.
Office Action; U.S. Appl. No. 13/903,206 dated Jul. 29, 2016.
Final Office Action; U.S. Appl. No. 13/903,206 dated Feb. 10, 2017.
Advisory Action; U.S. Appl. No. 13/903,206 dated May 1, 2017.
Office Action; U.S. Appl. No. 13/903,206 dated Dec. 27, 2017.
Office Action; U.S. Appl. No. 16/132,598 dated Oct. 18, 2018.
Office Action; U.S. Appl. No. 16/510,138 dated Jan. 13, 2020.
Office Action; U.S. Appl. No. 16/510,138 dated Jun. 26, 2020.
Notice of Allowance; U.S. Appl. No. 16/510,138 dated Sep. 2, 2020.
Notice of Allowance; U.S. Appl. No. 16/132,598 dated Mar. 5, 2019.

* cited by examiner

PERFORMING AN ACTION ASSOCIATED WITH A MOTION BASED INPUT

RELATED APPLICATION DATA

The present application is a continuation of U.S. patent application Ser. No. 16/510,138, filed Jul. 12, 2019, which is a continuation of U.S. patent application Ser. No. 16/132,598, filed Sep. 17, 2018, now U.S. Pat. No. 10,353,484 B2, which is a continuation of U.S. patent application Ser. No. 13/903,206, filed May 28, 2013, now U.S. Pat. No. 10,078,372 B2, the content of these documents being incorporated herein by reference.

TECHNICAL FIELD

The present disclosure relates to a method and apparatus for performing an action associated with a motion based input.

BACKGROUND

Human-computer interaction is enhanced when the methods of detecting user input feel natural to the user. This has prompted an increase in computing devices having a touch sensitive display suited for receiving user inputs and further suited to act as a primary human-computer interaction interface. However, other human-computer interaction interfaces are possible.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
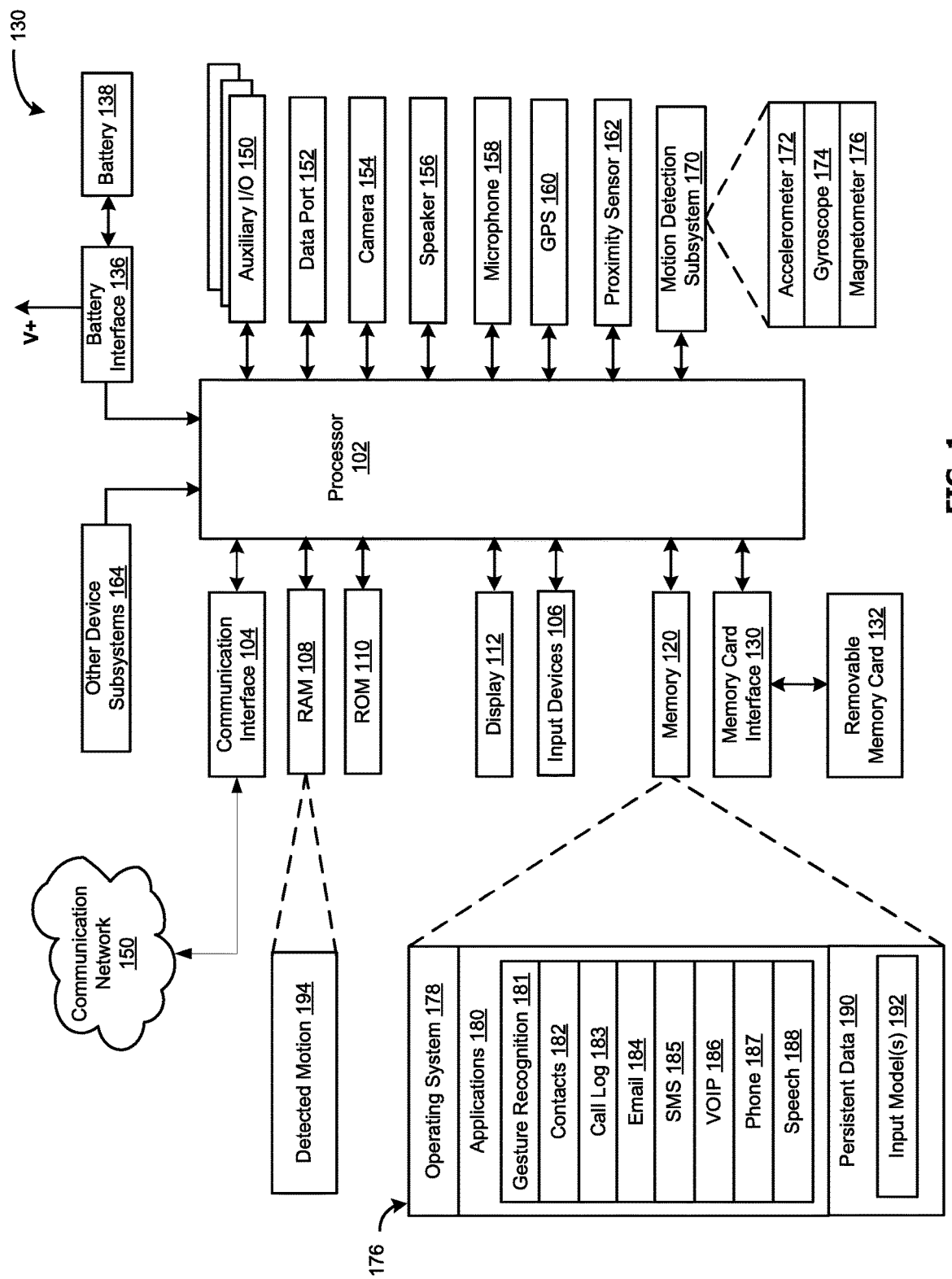
FIG. 1 is a block diagram illustrating a mobile computing device having a motion detection subsystem and suitable for detecting a motion based input.

An input device that is suited for detecting motion and further interpreting the detected motion as a motion based input may in some scenarios provide a human-computer interaction interface that feels natural to a user. For example, making a phone call using a mobile phone may involve selecting a phone number then moving the phone to one's ear. The motion associated with moving a mobile phone to one's ear can be detected using a motion detection subsystem of the mobile phone, which may then be characterized as a detected motion by a processor. The characterized motion can then be compared by the processor with a previously stored input model to determine if a match between the detected motion and the stored input model exists. When a match is determined to exist, an action associated with the input model may then be performed, for example the action may be to place a call.

A continuous stream of data input from the motion detection subsystem can be provided to the processor. The continuous stream of data input is analyzed in real-time by the processor; thus if at any moment the processor determines that a match is found, the associated action will be performed. However, the matching algorithm implemented may output a wrong determination. For example, when the mobile phone is removed from a purse, the detected device motion may match the input model and thus cause the action associated with the input model to be performed unwanted. The unwanted action may be problematic for users in many ways, depending on the action performed and when it is performed.

In accordance with one aspect of the present disclosure, there is provided a method implemented by a computing device for performing an action associated with a motion based input. The method may be implemented by a computing device comprising a processor, and a memory, such as a non-transitory computer readable medium, and motion detection sensor coupled to the processor. The memory stores an input model associated with a gesture input. The method comprises detecting a motion of the computing device; matching the detected motion with the input model; determining a confidence level associated with the match; if the confidence level is above a pre-determined threshold, performing an action associated with the gesture input; and if the confidence level is below the pre-determined threshold, performing the action responsive to receiving a positive confirmation of the gesture input. The memory has stored thereon executable instructions that, when executed by the processor of the computing device, configure the computing device to perform the method.

In some embodiments, the method further comprises determining the action associated with the input model based on a temporal context, wherein the temporal context is a state of an application when the motion is detected.

In some embodiments, determining the confidence level further comprises comparing the detected motion with the input model stored in memory. The detected motion may also be stored in memory as an additional input model after receiving the positive or negative confirmation of the gesture input. The input model may also be adjusted in response to receiving the positive confirmation or a negative confirmation of the gesture input.

In some embodiments, the method further comprises prior to detecting the motion, receiving a selection in adjusting the input model in response to receiving a negative confirmation of the gesture input indicating selection of a message; and wherein performing the action comprises sending a reply to the message.

In some embodiments, the method further comprises prior to detecting the motion, receiving a selection indicating selection of a contact entry, the contact entry having a plurality of phone numbers stored in memory. In some embodiments, performing the action further comprises prompting the user to select a phone number of the plurality of phone numbers for dialing, receiving a voice input selecting the phone number and dialing the phone number.

In some embodiments, receiving a confirmation comprises prompting a user, for example via a voice prompt, to confirm the gesture input, and receiving an input, for example a voice input, indicating the positive confirmation.

In accordance with another aspect of the present disclosure, there is provided a method implemented by a computing device comprising a processor, and a memory, motion detection sensor and proximity sensor coupled to the processor, the method comprising: measuring, using the motion detection sensor, motion data representing a detected motion of the computing device at regular intervals; measuring, using the proximity sensor, proximity data representing a proximity of the computing device to an object at regular intervals over a duration of the detected motion; matching the motion data and proximity data with an input model associated with a gesture using a plurality of criteria defined by the input model, the plurality of criteria comprising a pattern of proximity data representing changes in the proximity of the computing device to the object during the detected motion and a pattern of motion data representing the detected motion; determining a confidence level associated with the match based on how closely the motion data and proximity data match the plurality of criteria in the input model; in response to determining the confidence level is above a threshold, performing an action associated with the gesture; and in response to determining the confidence level is below the threshold, prompting for designated confirmatory input, wherein the designated confirmatory input is different from the gesture, and performing the action associated with the gesture in response to receiving designated confirmatory input indicating a positive confirmation to perform the action.

In some embodiments, the method further comprises: determining the action associated with the gesture based on a state of an application when the motion data was measured.

In some embodiments, the method further comprises: storing the motion data in association with the proximity data in the memory as an additional input model in response to receiving the designated confirmatory input indicating a positive confirmation to perform the action or designated confirmatory input indicating a negative confirmation to not perform the action.

In some embodiments, the method further comprises: adjusting the input model in response to receiving the designated confirmatory input indicating a positive confirmation to perform the action or designated confirmatory input indicating a negative confirmation to not perform the action.

In some embodiments, the method further comprises: prior to measuring the motion data and proximity data, receiving a selection indicating selection of a contact entry, the contact entry having a plurality of phone numbers stored in memory; and wherein performing the action comprises: prompting a user to select a phone number of the plurality of phone numbers for dialing; receiving a voice input selecting the phone number; and dialing the phone number.

In some embodiments, prompting comprises announcing, via a speaker of the computing device, a voice prompt, wherein designated confirmatory input indicating a positive confirmation to perform the action or designated confirmatory input indicating a negative confirmation to not perform the action comprising a voice input is received via a microphone of the computing device.

In some embodiments, prompting comprises displaying a message on a display of the computing device, and wherein designated confirmatory input indicating a positive confirmation to perform the action or designated confirmatory input indicating a negative confirmation to not perform the action is received via an input device of the computing device.

In some embodiments, the input device is a hardware keyboard. In other embodiments, the input device is a touch-sensitive display.

In some embodiments, the method further comprises: selecting an input model, from a plurality of input models, based on a state of an application when the motion data was measured.

In some embodiments, the pattern of motion data is defined by a displacement of the detected motion correlated to a distance the computing device is moved when the gesture input is performed, a speed of the detected motion correlating a speed at which the computing device is moved when the gesture input is performed, a direction of the displaced distance, and a frequency response of the detected motion.

In some embodiments, each criterion in the plurality of criteria of the input model is compared individually against the motion data or proximity data.

In some embodiments, a weighing function is applied to each criterion in the plurality of criteria of the input model based on the significance of the criterion.

In accordance with a further aspect of the present disclosure, there is provided a method for performing an action associated with a motion based input. the method comprises: measuring, using a motion sensor of a computing device, motion data representing a detected motion of the computing device; measuring, using a proximity sensor of the computing device, proximity data representing a proximity of the computing device to an object over a duration of the detected motion; matching the measured motion data and measured proximity data to a gesture based on the detected motion and the proximity of the computing device to the object over the duration of the detected motion; and in response to matching the measured motion data and measured proximity data to the gesture, performing an action associated with the gesture.

In accordance with yet a further aspect of the present disclosure, there is provided a computing device, comprising a processor and a memory, wherein the memory has stored thereon executable instructions that, when executed by the processor of the computing device, configure the computing device to perform one or more of the methods described above and herein.

In accordance with yet a further aspect of the present disclosure, there is provided a computing device comprising: a memory for storing instructions and for storing an input model associated with a gesture; a motion detection sensor; a proximity sensor; a processor coupled to the memory, the proximity sensor and the motion detection sensor, wherein the processor is configured to: measure, using the motion detection sensor, motion data representing a detected motion of the computing device at regular intervals; measure, using the proximity sensor, proximity data representing a proximity of the computing device to an object at regular intervals over a duration of the detected motion; match the motion data and proximity data with an input model associated with a gesture using a plurality of criteria defined by the input model, the plurality of criteria comprising a pattern of proximity data representing changes in the proximity of the computing device to the object during the detected motion and a pattern of motion data representing the detected motion; determine a confidence level associated with the match based on how closely the motion data and proximity data match the plurality of criteria in the input model; in response to determining the confidence level is above a threshold, perform an action associated with the gesture; and in response to determining the confidence level is below the threshold, prompt for designated confirmatory input, wherein the designated confirmatory input is different from the gesture, and perform the action associated with the gesture in response to receiving designated confirmatory input indicating a positive confirmation to perform the action.

In some embodiments, the processor is further configured to: determine the action associated with the gesture based on a state of an application when the motion data was measured.

In some embodiments, the processor is further configured to: store the motion data in association with the proximity data in memory as an additional input model in response to receiving the designated confirmatory input indicating a positive confirmation to perform the action or designated confirmatory input indicating a negative confirmation to not perform the action.

In some embodiments, the processor is further configured to: adjust the input model in response to receiving the designated confirmatory input indicating a positive confirmation to perform the action or designated confirmatory input indicating a negative confirmation to not perform the action.

In some embodiments, the processor is further configured to: receive, prior to measuring the motion data and proximity data, a selection indicating selection of a contact entry, the contact entry having a plurality of phone numbers stored in memory; and when performing the action: prompt a user to select a phone number of the plurality of phone numbers for dialing; receive a voice input selecting the phone number; and dial the phone number.

In some embodiments, the processor is further configured to prompt by announcing, via a speaker of the computing device, a voice prompt, wherein designated confirmatory input indicating a positive confirmation to perform the action or designated confirmatory input indicating a negative confirmation to not perform the action comprising a voice input is received via a microphone of the computing device.

In accordance with yet a further aspect of the present disclosure, there is provided a non-transitory machine readable medium having tangibly stored thereon executable instructions that, when executed by a processor of a computing device, cause the computing device to perform one or more of the methods described above and herein.

Reference is made to FIG. 1 which illustrates an example mobile computing device 130 (referred to hereinafter as merely mobile device 130 for convenience) suitable for detecting a motion based input. Examples of the mobile device 130 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and special purpose digital camera. In some embodiments, the mobile computing device 130 is an accessory device, receiving instructions from a second computing device (not shown). Examples of an accessory device may include, without limitation, any motion sensing input device.

The mobile device 130 includes a rigid case (not shown) housing the electronic components of the mobile device 130. The electronic components of the mobile device 130 are mounted on a printed circuit board (not shown). The mobile device 130 includes a processor 102 which controls the overall operation of the mobile device 130. Communication functions, including data and voice communication, are performed through a communication interface 104. The communication interface 104 receives messages from and sends messages via the communication network 150. The communication interface 104 typically includes a WWAN interface for communication over cellular networks and a WLAN interface for communication over Wi-Fi networks.

The processor 102 interacts with other components, such as one or more input devices 106, RAM 108, ROM 110, a display 112, persistent (non-volatile) memory 120 which may be flash memory or any other suitable form of memory, auxiliary I/O subsystems 150, data port 152 such as serial data port (e.g., Universal Serial Bus (USB) data port), camera 154 such as video and/or still camera, speaker 156, microphone 158, a motion-detection subsystem 170, a global positioning system (GPS) device 160 which enables the processor 102 to determine GPS coordinates (i.e., location) of the mobile device 130 at any appropriate time, proximity sensor 162 which enables the processor 102 to determine the distance between the mobile device 130 and an object at any appropriate time, and other device subsystems generally designated as 164. The components of the mobile device 130 are coupled via a communications bus (not shown) which provides a communication path between the various components.

The display 112 may be provided as part of a touchscreen which provides an input device 106. The display 112 which together with a touch-sensitive overlay (not shown) operably coupled to an electronic controller (not shown) comprise the touchscreen. User-interaction with the GUI is performed through the input devices 106. Information, such as text, characters, symbols, images, icons, and other items are rendered and displayed on the display 112 via the processor 102. The processor 102 may interact with the motion-detection subsystem 170 to detect direction of gravitational forces or gravity-induced reaction forces so as to determine, for example, the orientation of the mobile device 130 in order to determine a screen orientation for the GUI.

The input devices 106 may include a keyboard, control buttons (not shown) such as a power toggle (on/off) button, volume buttons, camera buttons, general purpose or context specific buttons, 'back' or 'home' buttons, phone function buttons, and/or a navigation device. When the display 112 is provided as part of a touchscreen, the various buttons or controls may be provided by onscreen user interface elements displayed on the display 112 instead of, or in addition to, physical interface components. The keyboard may be provided instead of, or in addition to, a touchscreen depending on the embodiment. At least some of the control buttons may be multi-purpose buttons rather than special purpose or dedicated buttons.

The mobile device 130 may also includes a memory card interface 130 for receiving a removable memory card 132 comprising persistent memory, such as flash memory. A removable memory card 132 can be inserted in or coupled to the memory card interface 130 for storing and reading data by the processor 102 including, but not limited to still images and optionally video images captured the camera 154. Other types of user data may also be stored on the removable memory card 132. Other types of removable digital image storage media, such as magnetic hard drives, magnetic tape, or optical disks, may be used in addition to, or instead of, the removable memory card 132.

The processor 102 operates under stored program control and executes software modules 176 stored in memory, for example, in the persistent memory 120. The persistent memory 120 also stores data 190 such as an input model 192 representing a gesture input. As illustrated in FIG. 1, the software modules 176 comprise operating system software 178 and software applications 180. The software applications 180 may include a gesture recognition application 181, a contacts application 182, a call log application 183, an email application 184, a Short Messaging Service (SMS) application 185, a Voice over Internet Protocol (VoIP) application 186, a phone calling application 187, a speech application 188, and other applications. The software modules 176 or parts thereof may be temporarily loaded into volatile memory such as the RAM 108. The RAM 108 is used for storing runtime data variables and other types of data or information, such as data generated in real-time by the motion-detection subsystem 170 stored as detected-motion 194. Although specific functions are described for various types of memory, this is merely one example, and a different assignment of functions to types of memory could also be used.

The communication interface 104 may include a short-range wireless communication subsystem (not shown) which provides a short-range wireless communication interface. The short-range wireless communication interface is typically Bluetooth® interface but may be another type of short-range wireless communication interface including, but not limited to, an IR interface such as an IrDA interface, an IEEE 802.15.3a interface (also referred to as UWB), Z-Wave interface, ZigBee interface or other suitable short-range wireless communication interface.

A received signal, such as a text message, an e-mail message, or web page download, is processed by the communication subsystem 104 and input to the processor 102. The processor 102 processes the received signal for output to the display 112 and/or to the auxiliary I/O subsystem 150. A subscriber may generate data items, for example e-mail messages, which may be transmitted over the communication network 150 through the communication subsystem 104, for example.

The mobile device 130 also includes a battery 138 as a power source, which is typically one or more rechargeable batteries that may be charged, for example, through charging circuitry coupled to a battery interface such as the serial data port 152. The battery 138 provides electrical power to at least some of the electrical circuitry in the mobile device 130, and the battery interface 136 provides a mechanical and electrical connection for the battery 138. The battery interface 136 is coupled to a regulator (not shown) which provides power V+ to the circuitry of the mobile device 130.

The proximity sensor 162 may comprise a sensor that transmits a field or signals (such as electromagnetic) to detect the presence of nearby objects (i.e. the sensor's target). The maximum distance that the proximity sensor 174 can detect may be predetermined or adjustable.

The mobile device 130 also comprises a motion-detection subsystem 170 comprising at least one sensor connected to the processor 102 and which is controlled by one or a combination of a monitoring circuit and operating software. In some embodiments, the motion-detection subsystem 170 enables to processor 102 to determine if the mobile device 130 is in motion and the nature of any sensed motion at any appropriate time. In some embodiments, the motion-detection subsystem 170 enables to processor 102 to determine if a person or object is the sensitivity region of the motion-detection subsystem 170 is moving.

The motion-detection subsystem 170 may comprise one or more sensors including any of accelerometer 172 (such as a three-axis accelerometer), gyroscope 174, magnetometer 176, or other suitable sensor, or combinations thereof. The motion detection subsystem, or parts thereof, may be combined or shared, for example, within an integrated component. In some embodiments, the motion-detection subsystem 170 may comprise one or more imaging sensors, including but not limited to imaging sensors suited to detect infrared light.

Figure 2:
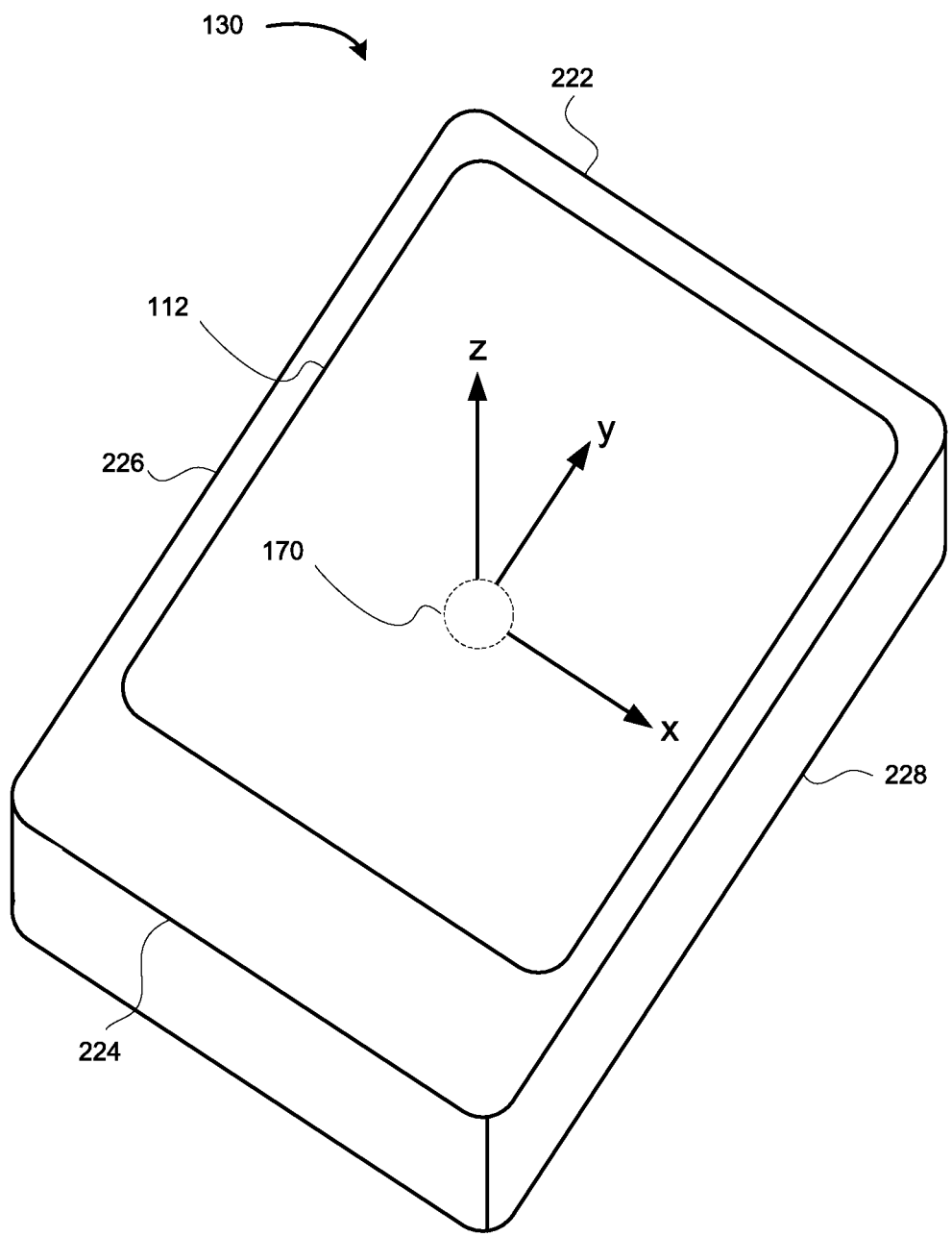
FIG. 2 is a perspective view of the mobile computing device of FIG. 1 with a three-axis motion detection subsystem mounted therein in accordance with one example embodiment of the present disclosure.

The motion-detection subsystem 170 may include one or both of a three-axis accelerometer 172 and a three-axis gyroscope 174, each having x-, y- and z-sensing axes. As shown in FIG. 2, the sensing axes x-, y-, z- may be aligned with the form factor of the device 130. In some embodiments, the motion-detection subsystem 170 is aligned such that a first sensing axis x extends longitudinally along the midpoint of the handheld electronic device 130 between left 226 and right 228 sides of the device 130, a second sensing axis y extends laterally along the midpoint of the device 130 between top 222 and bottom ends 224, and a third sensing axis z extends perpendicularly through the x-y plane defined by the x- and y-axes at the intersection (origin) of these axes. It is contemplated that the sensing axes x-, y-, z- may be aligned with different features of the device 130 in other embodiments.

Figure 3:
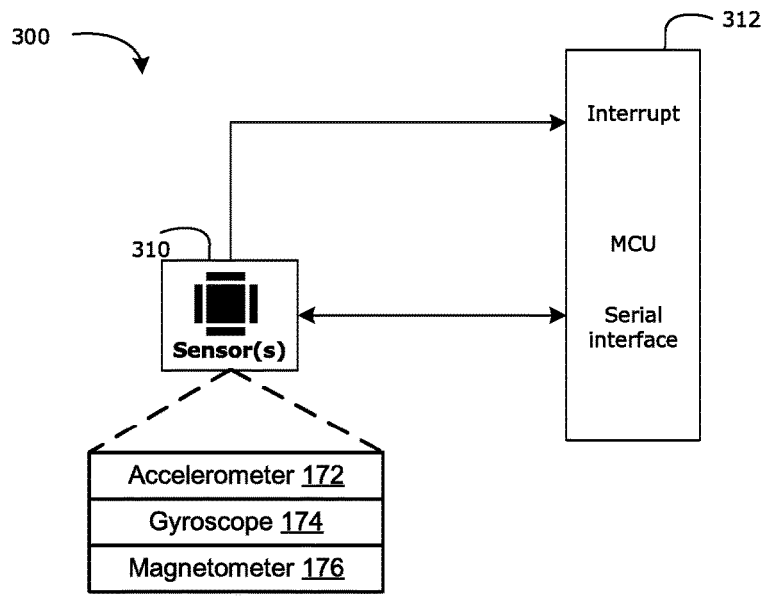
FIG. 3 is a block diagram of a circuit of a motion detection subsystem suitable for use with the mobile computing device of FIG. 1 in accordance with one example embodiment of the present disclosure.

Referring briefly to FIG. 3, motion-detection subsystem 170 in accordance with one example embodiment of the present disclosure will be described. The circuit 300 comprises a sensor or a group of sensors, including one of or any combination of accelerometer 172, gyroscope 174, magnetometer 176 or other sensors, connected to the interrupt and serial interface of a controller (MCU) 312. The controller 312 could for example be implemented by the processor 102 (FIG. 1) of the device 130. The operation of the controller 312 is controlled by software, which may be stored in internal memory of the controller 312. The operational settings of the sensor(s) 310 are controlled by the controller 312 using control signals sent from the controller 312 to the sensor(s) 310 via the serial interface. The controller 312 may determine the motion of the device in accordance inputs from the sensor(s) 310. The inputs may also be sent to the processor 102 (FIG. 1) of the device 130 via its serial interface where a detected motion is determined by the operating system 178, or other software module 176. In other embodiments, a different digital configuration could be used, or a suitable analog sensor(s) and control circuit(s) could be used.

As will be appreciated by persons skilled in the art, the accelerometer 172 is a sensor which determines acceleration from motion (e.g. movement of the computing device 130) and gravity, which are detected by a sensing element and converted into an electrical signal producing a corresponding change in output. The sensor is available in one-, two- or three-axis configurations. Accelerometers may produce digital or analog output signals depending on the type of accelerometer. Generally, two types of outputs are available depending on whether an analog or digital accelerometer used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The detection range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

Figure 4A:
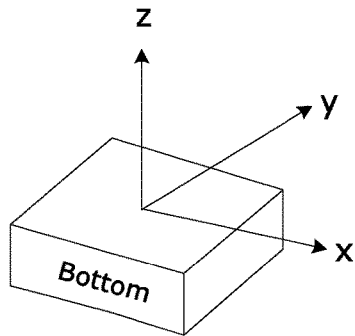
FIGS. 4A to 4C are schematic diagrams illustrating the assignment of pitch and roll vectors of a three-axis accelerometer in accordance with one example embodiment of the present disclosure.
Figure 4B:
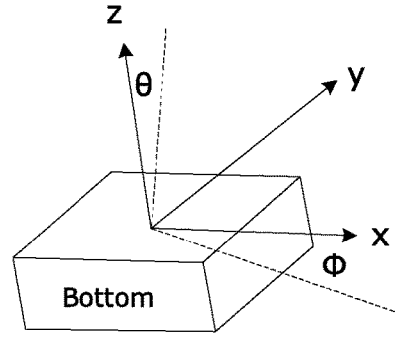
Figure 4C:
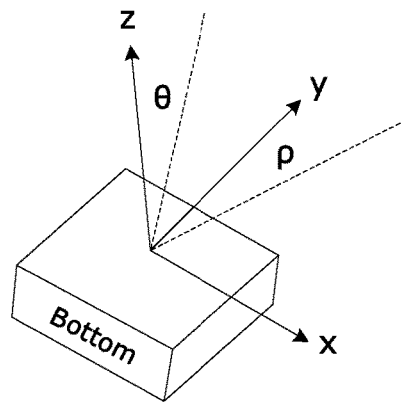

Referring now to FIGS. 4A to 4C, the assignment of pitch and roll vectors of a three-axis accelerometer in accordance with one example embodiment of the present disclosure will be briefly described. Each sensing axis may be aligned with an axis of the mobile device 130. As discussed above, the x-axis and y-axis are typically aligned with the input plane of the display 112. The z-axis is perpendicular to the horizontal plane.

As shown in FIG. 4B, pitch (Φ) is the angle of the x-axis relative to the ground. θ is the angle of the z-axis relative to gravity. As shown in FIG. 4C, roll (ρ) is the angle of the y-axis relative to the ground. It will be appreciated that rotation may occur about any combination of sensing axes. The concepts and methodology described herein can be applied to any axis orientation and any combination of pitch (Φ) angle, roll (ρ) angle and θ (the angle of the z-axis relative to gravity). Pitch (Φ), roll (ρ) and the angle of the z-axis relative to gravity (θ) of a three-axis accelerometer may be calculated using equations (1), (2) and (3):

$$\varphi = \arctan\left(\frac{x_{sensor}}{\sqrt{y_{sensor}^2 + z_{sensor}^2}}\right) \quad (1)$$

$$\rho = \arctan\left(\frac{y_{sensor}}{\sqrt{x_{sensor1}^2 + z_{sensor}^2}}\right) \quad (2)$$

$$\theta = \arctan\left(\frac{\sqrt{x_{sensor}^2 + y_{sensor}^2}}{z_{sensor}}\right) \quad (3)$$

where $x_{sensor}$, $y_{sensor}$ and $z_{sensor}$ are the measurements from the x, y and z-axes of the three-axis accelerometer. It will be appreciated that pitch (Φ), roll (ρ) and the angle of the z-axis relative to gravity (η) can also be determined by other means.

As will be appreciated by persons skilled in the art, the gyroscope 174 is a sensor which converts angular momentum from motion (e.g. movement of the computing device 130 or a portion thereof due to strike force) into an electrical signal, producing a corresponding change in output, and is available in one-, two- or three-axis configurations. As shown in FIG. 2, the three-axis configuration gyroscopes may have the x-axis and y-axis aligned with the input plane of the display 112 and the z-axis perpendicular to the horizontal plane. However, other configurations are possible.

Gyroscopes may produce digital or analog output signals depending on the type of gyroscope. The gyroscope may be of any type including, but not limited to a MEMS gyroscope, which may produce digital or analog output signals. Generally, two types of outputs are available depending on whether an analog or digital gyroscope is used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface.

As will be appreciated by persons skilled in the art, the magnetometer 176 is a sensor which converts magnetic field strength, and in some embodiments the magnetic field strength and direction, into an electrical signal, producing a corresponding change in output. Magnetometers provide the functionality of a compass. In some embodiments, the magnetometer 176 is a Hall Effect sensor, varying output voltage in response to the magnetic field. Magnetometers may produce digital or analog output signals depending on the type of magnetometer. The magnetometer may produce digital or analog output signals. Generally, two types of outputs are available depending on whether an analog or digital magnetometer is used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface.

Figure 5:
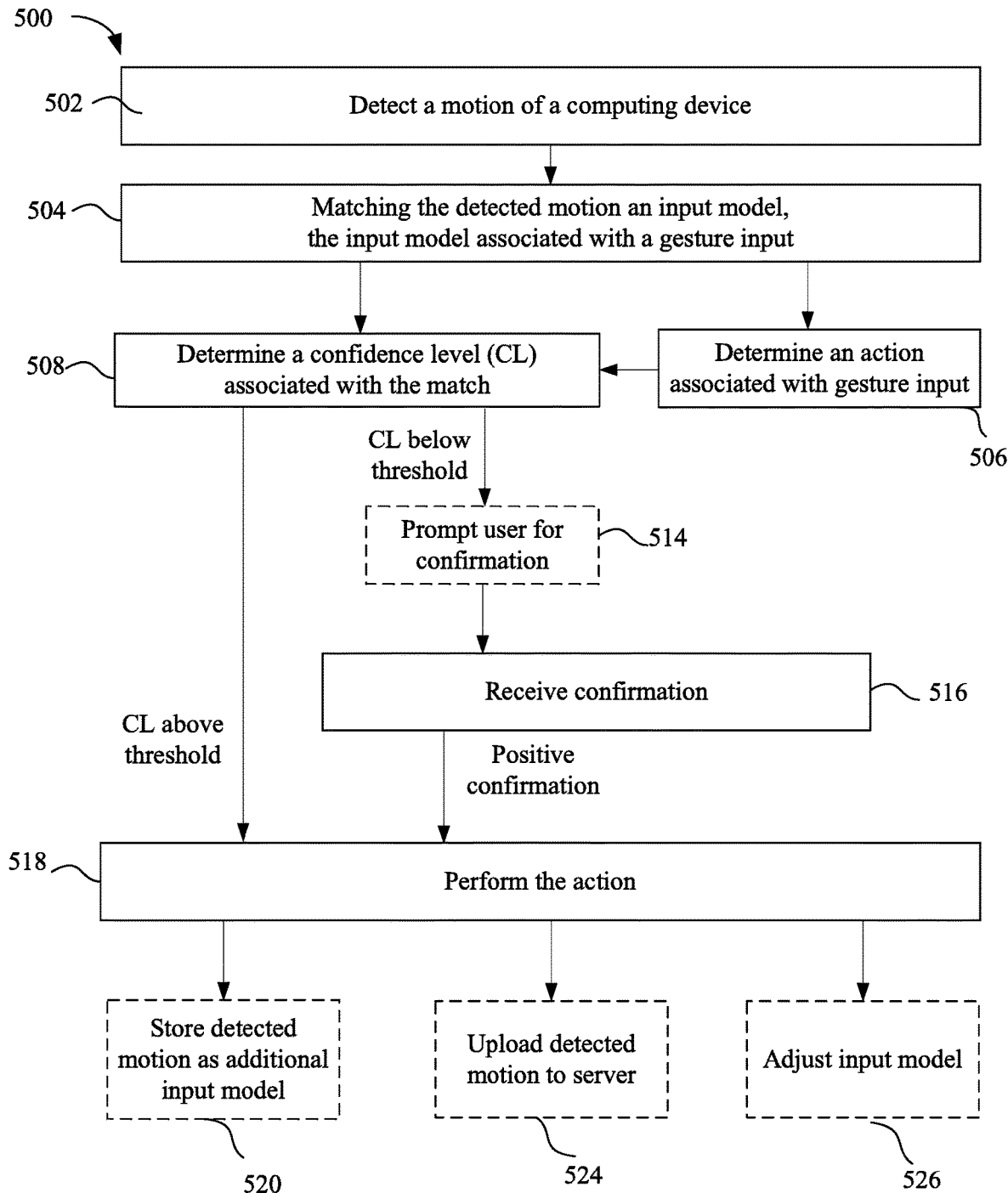
FIG. 5 is a flow diagram illustrating a method for performing an action associated with a motion based input.

Reference is now made to FIG. 5, illustrating a method 500 for detecting a motion based input. A computing device 130 having, memory 120 storing one or more input models 192, a motion-detection subsystem 170 and a processor 102 is suitable for performing the method 500. Instructions for performing the method 500 may be stored in a non-transitory computer readable medium as an application, such as the gesture-recognition application 181 stored in memory 120.

In some embodiments, the OS 178 is configured such that processor 102 executes gesture-recognition application 181 in the background when the computing device 130 is turned on, such that motion-detection subsystem 170 is configured to sample data continuously. In some embodiments, the data samples are obtained at predefined sampling intervals, which may be a regular interval, for example a data sample is obtained every 10 ms when a user interaction is detected and then every 100 ms when user interaction is no longer detected.

When a short sampling interval is used, the motion-detection subsystem 170 will collect more data, thus requiring more resources, such as memory, processing power, power consumption, and other resources. Accordingly, it is beneficial to optimize the sampling interval for different scenarios. In some embodiments, the sampling interval is varied depending on the last known state of the device. For example, the sampling interval may be shortened when the imminent user interaction is expected, such as when the display 112 is turned on, or when a phone call is received. However, when user interaction is not expected, such as when the display 112 is turned off, reducing the sample interval will help reduce power consumption of the motion-detection subsystem 170. Other optimizations of the sampling intervals are also possible.

Figure 6A:
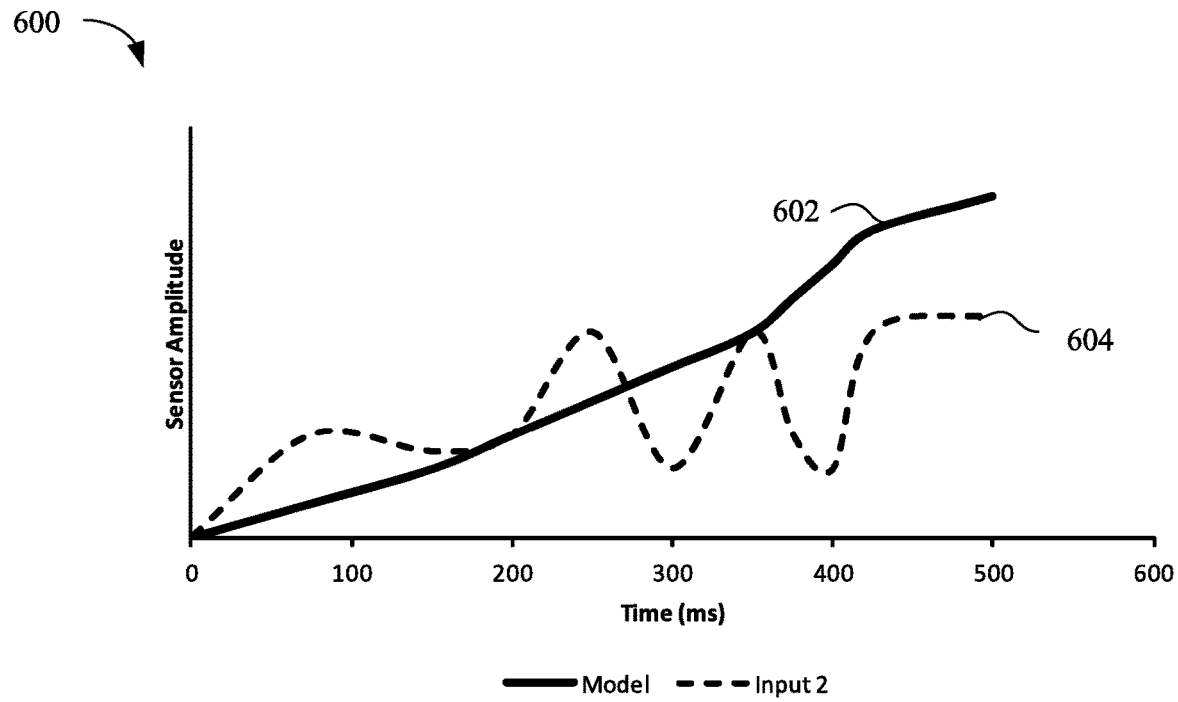
FIG. 6A is a plot illustrating a first set of sample data from a motion detection subsystem, of the mobile computing device of FIG. 1, compared with a first example input model.
Figure 6B:
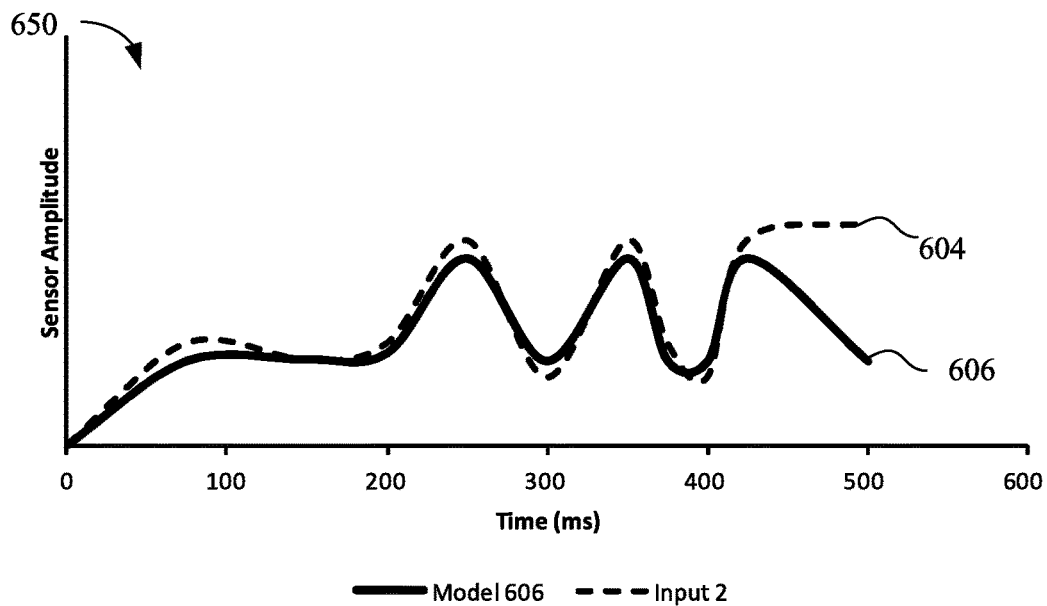
FIG. 6B is a plot illustrating the first set of sample data from the motion detection subsystem, of the mobile computing device of FIG. 1, compared with a second example input model.
Figure 7A:
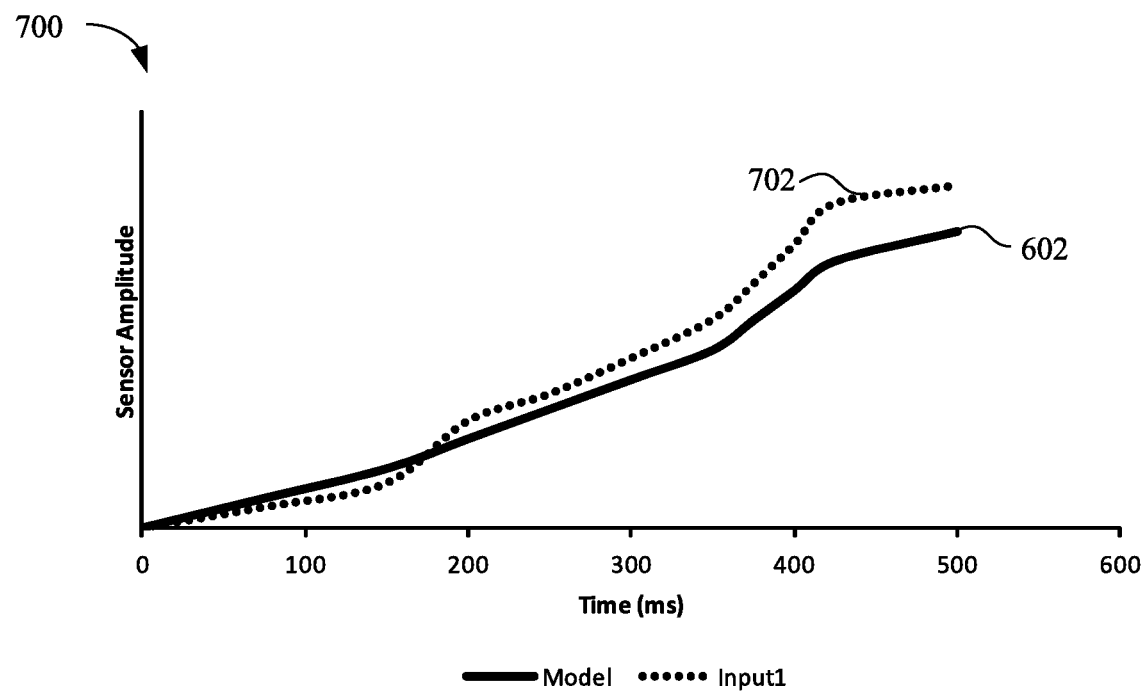
FIGS. 7A and 7B are plots illustrating sets of sample data from a motion detection subsystem, of the mobile computing device of FIG. 1, compared with the first example input model.
Figure 7B:
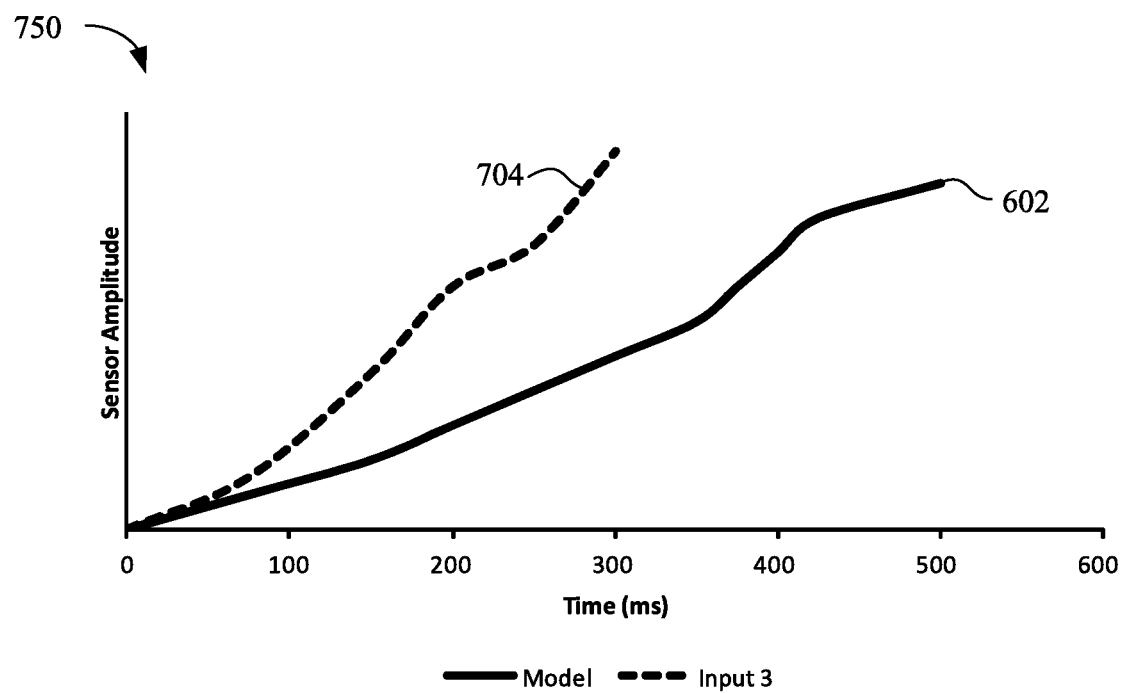

In some embodiments, the sampled data from the motion-detection subsystem 170 is then saved in a buffer, for example in RAM 108, and/or in memory 120 as detected-motion 194. The detected-motion 194 represents the motion detected using the motion-detection subsystem 170, allowing for processing of the data by the processor 102. The detected-motion 194 may be stored in the time-domain by storing a value of the amplitude for each sensor input provided by the motion-detection subsystem 170 and a corresponding time value for each of one or more sensor inputs. For example, the three-axis accelerometer 172 and the three-axis gyroscope 174 each provide amplitude measurements of each axis at each sampling interval, and the magnetometer 176 provides a value of the detected magnetic field strength. Accordingly, the sampled data for the various sensor combinations can be combined in memory with detected-motion 194. Examples of time-domain representations of one of one or more sensor inputs provided by the motion-detection subsystem 170 are shown in FIGS. 6, 7A and 7B by plots 604, 702 and 704 respectively. The plots may represent one amplitude value, as measured over time, of one of the amplitude values measured by motion-detection subsystem 170.

The time-domain representation of the detected motion 194 can also be converted into the frequency domain by the processor 102 applying a Fourier transform function, such as a Fast-Fourier transform (FFT). The frequency domain data may also be saved in the buffer, for example in RAM 108, and/or in memory 120 as a separate data variable, or combined in memory with the detected motion 194. By converting to the frequency domain, the processor 102 is able to process the sampled data more efficiently in some cases.

In example embodiments, the computing device 130 is configured to perform certain steps upon detecting predetermined motions of the device, the motions associated with gesture inputs. In this regard, FIG. 5 illustrates a set of steps that the computing device 130 is configured to perform in example embodiments. With reference to method 500 of FIG. 5, at step 502, when the computing device 130 is moved, the motion-detection subsystem 170 detects the motion of the device and provides sensor data characterizing the movement to the processor 102. The sensor data may be buffered in RAM 108 as detection motion 194. The processor 102 then determines (step 504) if the detected motion 194 matches an input model 192 associated with a gesture input. A gesture input corresponds to a predefined motion that is associated with a predefined device action that the processor 102 is configured to implement.

In this regard, in some embodiments, one or more input models 192 are stored in the memory 120 of the computing device 130; each input model 192 is associated with a gesture input, which in turn is associated with a resulting device action. For example, one input model 192 may define the action of moving a computing device 130 to one's ear, with the resulting device action being initiation of a phone call session. The input model 192 may be stored in the time-domain and include expected parameter ranges such as values of the amplitude for one or more sensor inputs over a sample duration, corresponding with an expected pattern of device motion; such that the processor 102 is able to match the input model 192 with the detected motion 194 obtained when the motion is detected. One example of an a time-domain representation of an amplitude value of one of one or more sensors inputs as defined in an example input model 192 is shown in FIGS. 6A, 7A and 7B (plot 602). A second example of an a time-domain representation of an amplitude value of one of one or more sensors inputs as defined in an example input model 192 is shown in FIG. 6B (plot 606).

Each user of a device 130 may operate the device 130 differently, such that the characteristics of the detected motion 194 obtained when the motion corresponding to the gesture input is detected is different for each user. Accordingly, to reduce a potential bias, in some example embodiments the stored input model 192 may be the result of averaging a number of sample input data.

In some embodiments, the input model 192 is stored in memory 120 at any stage of manufacture or configuration of the computing device 130. The input model 192 may be generated by averaging a number sample input data, generated by one or more users using one or more computing devices 130. In other embodiments, the stored input model 192 is downloaded from a server to memory 120 via communication network 150 during device initialization or during a device update procedure, and may be generated by averaging a number of sample input data generated by users of multiple devices 130 and uploaded to the server. In other embodiments, the stored input model 192 in device 130 is generated or updated locally by averaging a number of sample input data generated using the motion-detection subsystem 170 of the device 130. In such embodiments, the stored input model 192 may correspond to a model based on a default model that is adapted based on motion generated by the user or users of the subject device 130. Such adapting can occur during a calibration routine that could for example be performed during a device setup or installation. In some embodiments the input model 192 could be adapted over time based on usage patterns.

The stored input model 192 may include characteristics associated with one or more sensors 310 of the motion-detection subsystem 170. However, the stored input model 192 may only include accelerometer data, even when the motion-detection subsystem 170 includes both an accelerometer 172 and a gyroscope 174.

The input model 192 may define one or more criteria to be considered when determining if a detected motion 194 is associated with the input model 192. In some embodiments, the criteria will include at least one of: (1) the displacement of the detected motion 194, correlating with the distance the device 130 is moved when the gesture input is performed; (2) the speed of the detected motion 194, correlating with how fast the device 130 is moved when the gesture input is performed; (3) the direction of the displaced distance of the detected motion 194; (4) the frequency response of the detected motion 194, which may be useful in filtering out unintentional tremors and vibrations in the detected motion 194; and (5) data from other device components, such as the proximity sensor 162 or the display 112, which can provide additional information regarding the detected motion 194 in some embodiments. Each criteria of the input model 192 may be compared individually against the detected motion 194. A combination of all the compared criteria may then be used to determine at step 504 if the detected motion 194 matches the stored input model 192 and at step 508 the confidence level associated with the matching. In some embodiments, a weighting function is applied to each criterion based on the significance of the criterion.

At step 504, the processor 102 matches the detected motion 194 with the input model 192. This is described with reference to FIGS. 6A, 6B, 7A and 7B, showing graphs 600, 650, 700 and 750 respectively. Each plot illustrates, in the time-domain, an example amplitude of an input from one sensor of the motion-detection subsystem 170 (plots 604, 604, 702 and 704 respectively). FIGS. 6A, 7A and 7B also illustrates, in the time-domain, a first example amplitude value of a sensor input as defined in an example input model 192 (plot 602). The example input model shown in plot 602 may correspond to data from one axis of an accelerometer, showing a steady acceleration with minor variations in the rate of change of the acceleration over time, as shown by the steepness of the plot 602. FIG. 6B illustrates, in the time-domain, a second example amplitude value of a sensor input as defined in an example input model 192 (plot 606); as in some embodiments, more than one input model, each representing a different motion, may be stored in the memory 190 of the computing device 130, and as such, more than one input model will be used for matching at step 504.

The sample device motion as illustrated by plot 604, shown in FIG. 6A, may represent data from one axis of the accelerometer 172, showing an initial acceleration of the device 130 between time 0ms to time 100 ms, followed by an oscillation of the device 130 between time 200 ms to time 500 ms. Accordingly, the example device motion shown in plot 604 does not match the characteristics of the example input model shown in plot 602. The processor 102 may determine the same by comparing the characteristics of the example input model shown in plot 602 with the characteristics of the example device motion shown in plot 604, including but not limited to calculating and comparing in real-time the steepness of each plot, the pattern of acceleration of each plot, the total displaced distance corresponding to the each plot, the frequency response of each plot, and other characteristics. In this example, the processor 102 may further determine that a match does not exist.

However, the sample device motion as illustrated by plot 604 may be determined to match the second example input model shown in plot 606 of FIG. 6B. The second example input model represents a behavior similar to that of the sample device motion shown in plot 604. The second example input model may be associated with a different gesture input than the first example input model. By storing more than one input model in the memory, the computing device 130 is then able to recognize more than one motion, each representing a different action. Accordingly, at step 504, the processor 102 determines which input model is associated with the detected motion, if more than one input model is stored in memory. If no input models match the detected motion, then the detected motion may be ignored.

The sample device motion as illustrated by plot 702, shown in FIG. 7A, may represent data from one axis of the accelerometer 172, showing a steady acceleration with variations in the rate of change of the acceleration over time, as shown by the steepness of the plot 702. Accordingly, sample device motion as illustrated by plot 702 may be determined to match the characteristics of example input model shown in plot 602, as previously explained. While variations exist between the sample device motion as illustrated by plot 702 and the example input model shown in plot 602, the characteristics of both motions are sufficiently similar for the processor 102 to determine that the motion associated with the sample device motion of plot 702 is associated with the gesture input of the input model shown in plot 602.

If the processor 102 determines that the detected motion 194 matches an input model 192 associated with a gesture input at step 504, the processor 102 then determines an action associated with the gesture input at step 506. The action may be defined by an instruction or a series of instructions stored in memory 120, and thus the processor 102 only needs to retrieve the instructions from memory 120.

However, in some embodiments, the action is based on a temporal context; i.e. a state of an application when the motion is detected. The OS 178 of the computing device 130 allows for multi-tasking, thus gesture recognition application 181 may run in the background while another application is run in the foreground. One such application may be the contacts application 182. Prior to detecting the motion, the processor 102 receives a selection indicating selection of a contact entry in the contact application 182, the contact having a phone number stored in memory 120. The processor 102 thus determines that the action associated with the gesture input, given the temporal context (i.e. the selection of the contact), is to place a call to the phone number by dialing the number using phone application 187. In some embodiments, the contact may have a VoIP address stored in memory 120. The processor 102 thus determines that the action associated with the gesture input, given the temporal context (i.e. the selection of the contact having a VoIP address), is to place a VoIP call or video call, using VoIP application 186, to the VoIP address.

Another such application may be the call log application 183. Prior to detecting the motion, the processor 102 receives a selection indicating selection of an entry in the call log application 183, the entry having a phone number stored in memory 120. The processor 102 thus determines that the action associated with the gesture input, given the temporal context (i.e. the selection of the entry), is to place a call to the phone number by dialing the number.

Another such application may be the email application 184. Prior to detecting the motion, the processor 102 receives a selection of a received email in the email application, the received email having an email address associated with it. The processor 102, in some embodiments, determines that the action associated with the gesture input, given the temporal context (i.e. the selection of the email message), is to send an automated reply message to the sender of the received email. This may be beneficial when a user is driving, for example, and the automated reply message can be configured to indicate so. In other embodiments, the processor 102 detects that a phone number is embedded in the email message, or that the sender of the email message is associated with a contact entry in the contacts application 182, the entry having at least one phone number stored in memory 120. The processor 102 that the action associated with the gesture input, given the temporal context (i.e. the selection of the email message having a phone number associated therewith), is to place a call to the phone number by dialing the number.

Another such application may be the SMS application 185. For example, selection of a received SMS message may trigger actions similar to selection of a received email message. A phone call may be placed to the sender of the message, or an automated reply message may be sent to the sender of the message.

If the processor 102 determines that the detected motion 194 is matches the input model at step 504, the processor 102 then determines a confidence level associated with the match at step 508, representing the confidence in determining that the detected motion 194 is associated with the gesture input. For example, sample device motion of plot 702 of FIG. 7A more closely represents the sample input model of plot 602 than sample device motion of plot 704 of FIG. 7B. However, the sample device motion of plot 704 is indeed associated with a motion represented by the sample input model of plot 602, however, having a faster displacement than expected by sample input model of plot 602. Accordingly, the confidence level determined by the processor 102 for the sample device motion of plot 702 will be higher than for the sample device motion of plot 704.

In determining the confidence level, the processor 102 may apply a function to calculate a difference between a detected motion 194 and the stored input model 192. In one embodiment, each sensor input is considered individually, and each criterion defined by the input model, as previously explained, is considered individually for each sensor input. Accordingly, a plurality of differences may be computed. For example, in considering the distance displaced of the detected motion 194 in comparison with the distance displaced in the input model 192, the processor 102 may consider this individually from speed criterion. Thus, sample device motion of plot 702 and sample device motion of plot 704 are determined by the processor 102 to have the same displaced distance but at different speeds. The match percentage for the displacement parameter is therefore deemed to be the same for both samples, whereas the match percentage for the speed parameter is therefore deemed to be lower for sample of plot 704. The sample of plot 704 may simply correlate to the same motion occurring at a faster speed, for example, the user was in a rush.

In some embodiments, each of the sensor inputs and each of the criteria are then given a weighting factor to determine their significance in the match with the stored input model 192. A default weighting factor is stored in memory 120 during device manufacture and/or configuration. Furthermore, different weighting factors may be applied to different input models 192 when more than one input model is stored in memory 120. The processor 102 may compute a value for the confidence level by applying the weighting factors to a combination of the differences of all the sensor inputs and criteria to the input model 192. For example, a weighted average value may be computed.

In other embodiments, additional sensor inputs, such as proximity sensor 162, are considered as additional criteria in determining the confidence level. For example, the processor 102 may enable the proximity sensor 162 to sample data at a high sample rate, for example every 100 ms, when motion is detected by the motion-detection subsystem 170. The gesture input may be associated with a certain pattern of proximity data, as stored in the input model 192. For example, a gesture indicating placement of a phone call by moving the computing device 130 to a user's ear, the proximity sensor may detect decreasing proximity to an object (i.e. the head and ear).

In some embodiments, a threshold condition may be pre-defined and stored in memory 120, for example to require the value of the confidence level as determined at step 508 for a detected motion 194 to be above a pre-determined threshold, such as an 70 to 80% confidence level. When the confidence level is above the pre-determined threshold, the action associated with the gesture input is performed automatically at step 518. By requiring a high confidence level threshold, false-positives, in determining that the detected motion 194 is associated with an input model 192 and an action, are reduced; thus the chances that the computing device 130 performs an unwanted action are reduced.

When the confidence level is below the pre-determined threshold, the action associated with the gesture input is not performed by the processor 102 unless confirmation of the gesture input is received at the processor at step 516, thus ensuring that a gesture detected with low confidence is still performed, however, only after confirmation to reduce the chances of a false positive.

Optionally, the processor 102 may prompt the user to provide confirmation of the gesture input at step 514. Furthermore, depending on the nature of the action, the confirmation may be provided to the user and received by the processor 102 by different methods. For example, when the action requires placement of a phone call, the prompt may be a voice prompt provided to the user using the speaker 158 and the confirmation may be a voice confirmation received by microphone 158. In performing the voice prompt and voice confirmation, the gesture-recognition application 181 may call a function of speech application 188, to provide text-to-speech and speech-to-text conversion function. The voice prompt may for example ask: "Do you wish to make a call?" to which the voice confirmation may result in a positive "Yes" reply or a negative "No" reply. In some embodiments, for example, when a contact having more than one phone number is selected, the voice confirmation may prompt the user to choose a phone number for dialing, and the confirmation may result in receiving a voice input indicating a chosen phone number or a voice input indicating that no phone call was requested. Accordingly, the prompt may present itself as an opportunity to gain both the confirmation of the action to be performed and additional input.

In other embodiments, the prompt is displayed on the screen, and the confirmation is received via an input device 106, such as touchsensitive display 112.

The confirmation received at step 516 may either be negative or positive. However, in some embodiments, no confirmation is received. This may be due to a false positive; thus the user may not notice that a confirmation is required. When no confirmation is received, it is therefore considered to be a negative confirmation. When a positive confirmation is received, the processor 102 performs the action associated with the gesture input at step 518.

In some embodiments, when the confidence level is above the pre-determined threshold, the processor 102 still prompts the user to provide confirmation of the gesture input (not shown). However, the confirmation will not be required for all gesture inputs having a confidence level above the pre-determined threshold. Only a selected portion of gesture inputs having a confidence level above the pre-determined threshold will be confirmed, for example, one input for every 20 inputs, or one for every 50 inputs is confirmed. The remaining inputs are not confirmed, thereby requiring the user to perform fewer steps to perform the action. However, when a confirmation is required, the number of false positives can be reduced, for example, as explained previously.

Additionally and optionally, to better adapt and tailor the method 500 for future use by the user of the device 130, the processor 102 may execute one or more steps of optional steps 520, 524 and 526. The optional steps may be executed when the confidence level is above the pre-determined threshold, or the gesture input has been positively confirmed or negatively (not shown) confirmed. For a detected motion 194 having a confidence level above the pre-determined threshold the probability of a false-positive is low in determining that the detected motion 194 is associated with an input model 192. Additionally, when a detected motion 194 has been positively or negatively confirmed by the user, the confidence level associated with the confirmed detected motion 194 is considered to have a higher confidence level than previously determined.

At step 520, the detected motion 194 is stored in memory 120 as an additional input model. Further additional input models may be stored as the method 500 is repeated. The additional input model or models allow the processor 102 to compare later detected device motion with both the original input model 192 and the additional input model or models. When the processor 102 then determines if the detected motion 194 matches an input model 192 associated with a gesture input at step 504 and determines the confidence level at step 508, the processor may average the values of all the stored input models, applying a weighting factor to each additional input model corresponding to the confidence level associated with it. Furthermore, negatively confirmed input models may be used to identify false-positives. For example, after comparing the detected motion 194 with all positively confirmed input models, the processor 102 may also compare the detected motion 194 to ensure that it does match a negatively confirmed input model. As the additional input model is an indicator of a user's past behavior, it may provide a good indication of the user's future behavior.

In some embodiments, the OS 178 of the computing device 130 is configurable for multiple users. Accordingly, each additional input model may be associated with one of the multiple users, and only used for comparison purposes for only the user associated with it.

At step 524, the processor 102 may optionally upload the detected motion 194 to a server (not shown) via communication network 150. The detected motion 194 for uploading may either be positively confirmed vector, or may be associated with the gesture input with high confidence level. The server thus receives detected motions from multiple computing devices 130 over time, each associated with the same gesture input. The detected motion received at the server can then be analyzed, for example by averaging, to eliminate outliers and to define an input model associated with the gesture input based on a large number of inputs. The input model defined can then be sent to computing devices 130 over time, via communication network 150, and stored as input models 192; thus improving the correlation between the stored models and user behavior. The improved correlation will accordingly in some embodiments help reduce the number of false-positives and the number of events that require user confirmation.

When a negative or positive confirmation is received, the processor 102 may optionally adjust the stored input model 192 at step 526. The stored input model 192 may be adjusted by varying the weighting factors applied to the different criteria of the model in correspondence with the received confirmation. For example, the criterion associated with the speed of the detected motion may be identified as a less important criterion in matching the detected input with an input model. In one example, multiple detected inputs corresponding with the same gesture input, each performed at a different time and at different speeds; thus the criterion associated with the speed of the detected motion is given a lower weighting factor. By adjusting the stored input model 192, the input model becomes more adapted to a user's behavior over time, thus over time allowing for higher confidence levels when determining if the detected motion is associated with the gesture input and thus requiring fewer confirmations in future.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the described embodiments set forth in the examples, but should be given the broadest interpretation consistent with the description as a whole.

The invention claimed is:

1. A method, comprising:
measuring, using a motion sensor of a computing device, motion data representing a detected motion of the computing device;
increasing a sampling rate of a proximity sensor of the computing device in response to the detected motion;
measuring, using the proximity sensor of the computing device, proximity data representing a proximity of the computing device to an object over a duration of the detected motion;
determining whether the measured motion and the measured proximity of the computing device match at least one input model defining a gesture based on the measured motion and the measured proximity of the computing device to the object over the duration of the detected motion, wherein the gesture is defined by at least one of decreasing proximity to the object over the duration of the detected motion or increasing proximity to the object over the duration of the detected motion; and
in response to determining whether the measured motion and the measured proximity of the computing device matches the at least one input model defining the gesture, performing an action associated with the gesture.

2. The method of claim 1, further comprising:
determining, based on the measured motion and the measured proximity, a confidence level associated with the match;
in response to determining the confidence level is above a threshold, performing the action associated with the gesture;
in response to determining the confidence level is below the threshold, prompting for designated confirmatory input, wherein the designated confirmatory input is different from the gesture, and performing the action associated with the gesture in response to receiving designated confirmatory input indicating a positive confirmation to perform the action.

3. The method of claim 2, further comprising:
determining the confidence level associated with the match based on how closely the measured motion data matches a pattern of motion defined by the at least one input model of a plurality of input models and how closely the measured proximity data matches a pattern of proximity defined by the at least one input model of the plurality of input models.

4. The method of claim 3, further comprising:
selecting the one of the plurality of input models based on a state of an application at the time the motion data was measured.

5. The method of claim 3, further comprising:
updating the plurality of input models with the measured motion data and the measured proximity data in response to receiving the designated confirmatory input indicating a positive confirmation to perform the action or designated confirmatory input indicating a negative confirmation to not perform the action.

6. The method of claim 3, wherein determining the confidence level associated with the match further comprises comparing a criterion of a plurality of criteria associated with the at least one input model of the plurality of input models individually against the motion data or proximity data.

7. The method of claim 6, wherein a weighing function is applied to each criterion in the plurality of criteria associated with the at least one input model of the plurality of input models based on the significance of the criterion.

8. The method of claim 1, further comprising:
determining the action associated with the gesture based on a context of the computing device at the time the motion was detected.

9. The method of claim 8, wherein the context comprises a state of an application at the time the motion was detected.

10. The method of claim 1, wherein the duration of the detected motion can be greater, equal to, or lesser than a duration of the gesture.

11. The method of claim 1, wherein prompting comprises displaying a message on a display of the computing device, and wherein designated confirmatory input indicating a positive confirmation to perform the action or designated confirmatory input indicating a negative confirmation to not perform the action is received via a touchscreen or keyboard of the computing device.

12. The method of claim 1, wherein the prompting comprises announcing, via a speaker of the computing device, a voice prompt;
wherein designated confirmatory input indicating a positive confirmation to perform the action or designated confirmatory input indicating a negative confirmation to not perform the action comprises a voice input received via a microphone of the computing device.

13. The method of claim 1, wherein the gesture is defined by a displacement of the measured motion correlated to a distance the computing device is moved at the time the detected motion is performed, a speed of the measured motion correlating a speed at which the computing device is moved at the time the detected motion is performed, a direction of the displaced distance, and a frequency response of the detected motion.

14. The method of claim 1, wherein the measured motion data and measured proximity data are matched to the at least one input model of the plurality of input models for the gesture comprising moving the computing device towards a user's ear in response to a matching criteria of a plurality of criteria including the measured proximity data matching a pattern of proximity defining decreasing proximity to the object over the duration of the respective gesture.

15. The method of claim 1, further comprising:
prior to measuring the motion data and proximity data, receiving a selection indicating selection of a contact entry, the contact entry having a plurality of phone numbers stored in memory; and wherein performing the action comprises:
prompting a user to select a phone number of the plurality of phone numbers for dialing;
receiving a voice input selecting the phone number; and
dialing the phone number.

16. The method of claim 1, wherein the action associated with the gesture is only performed in response to a determination that a confidence level of the match is above a threshold.

17. A computing device comprising:
a processor;
a proximity sensor and a motion sensor each coupled to the processor;
wherein the processor is configured to:
measure, using the motion sensor, motion data representing a detected motion of the computing device;
increasing a sampling rate of the proximity sensor in response to the detected motion;
measure, using the proximity sensor, proximity data representing a proximity of the computing device to an object over a duration of the detected motion;
determine whether the measured motion and the measured proximity of the computing device match at least one input model defining a gesture based on measured motion and the measured proximity of the computing device to the object over the duration of the detected motion, wherein the gesture is defined by at least one of decreasing proximity to the object over the duration of the detected motion or increasing proximity to the object over the duration of the detected motion; and
in response to determining whether the measured motion and the measured proximity of the computing device matches the at least one input model defining the gesture, perform an action associated with the gesture.

18. A non-transitory machine readable medium having tangibly stored thereon executable instructions for execution by a processor of a computing device, wherein the executable instructions, in response to execution by the processor of the computing device, cause the computing device to:
measure, using a motion sensor, motion data representing a detected motion of the computing device;
increasing a sampling rate of a proximity sensor in response to the detected motion;
measure, using the proximity sensor, proximity data representing a proximity of the computing device to an object over a duration of the detected motion;
determine whether the measured motion and the measured proximity of the computing device match at least one input model defining a gesture based on the measured motion and the measured proximity of the computing device to the object over the duration of the detected motion, wherein the gesture is defined by at least one of decreasing proximity to the object over the duration of the detected motion or increasing proximity to the object over the duration of the detected motion; and
in response to determining whether the measured motion and the measured proximity of the computing device matches the at least one input model defining the gesture, perform an action associated with the gesture.

* * * * *